United States Patent Office 3,538,181
Patented Nov. 3, 1970

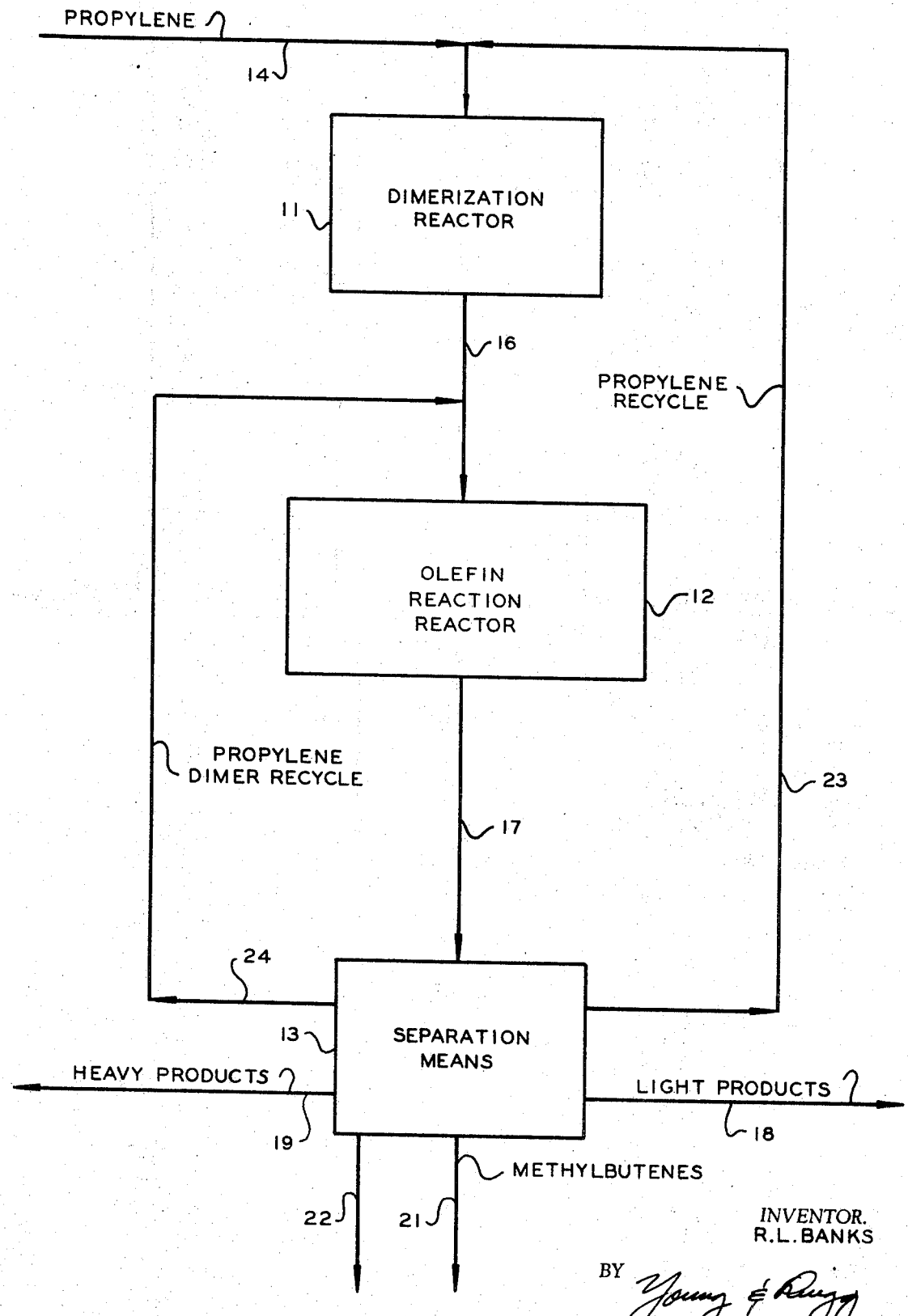

3,538,181
CONVERSION OF OLEFINS
Robert L. Banks, Bartlesville, Okla., assignor to Phillips Petroleum Company, a corporation of Delaware
Filed Apr. 3, 1967, Ser. No. 627,758
Int. Cl. C07c 3/62
U.S. Cl. 260—683                2 Claims

ABSTRACT OF THE DISCLOSURE

Propylene is converted to methylbutenes in a two step process comprising the dimerization of propylene and then the disproportionation of a mixture of proplene and its dimer.

---

This invention relates to the conversion of olefin hydrocarbons. In one aspect, it relates to preparing methylbutenes from propylene.

Methylbutenes are valuable intermediates for the production of isoprene. The present invention provides a process by which methylbutenes can be prepared from a relatively inexpensive and readily available 3-carbon feed stock, namely, propylene.

An object of this invention is to convert olefins.

Another object of this invention is to prepare methylbutenes.

Other aspects, objects and the advantages of my invention are apparent in the written description and the claims.

According to the invention, an olefin hydrocarbon is converted to at least one other olefin hydrocarbon by a two step catalytic conversion process. Further according to the invention, methylbutene is prepared from propylene in two consecutive catalytic steps.

In the first step, the feed olefin is dimerized over a suitable dimerization catalyst such as nickel oxide supported on silica-alumina, silica, or other suitable supports. Methods of nickel oxide catalyst preparation, catalyst activation, and propylene dimerization techniques with that catalyst are described in a number of patents. Some of these patents are U.S. 3,381,198; 2,581,228; 2,881,233; 2,094,608; 2,921,971; 2,926,130; 2,949,429; 2,985,598 and 3,045,054. When the feed is propylene, in general, the dimerization is carried out at 70–500° F., preferably 100–300° F., and at 0–1500 p.s.i.g. The nickel oxide content of these catalysts is in the range of 0.1 to about 35 weight percent, preferably 1–10 weight percent. Although processes employing nickel-containing dimerization catalysts are preferred, any suitable catalyst and process which will dimerize propylene can be used. The propylene can be diluted with paraffinic or cycloparaffinic diluents having up to about 12 carbon atoms per molecule. Conditions are generally chosen such that at least about 25 percent of the propylene is converted in this first stage of the process. The dimerization is generally carried out continuously through a fixed bed or fluidized bed catalyst system and the entire effluent from this first can be conducted for subsequent conversion in the second step of the process.

In the second step, a stream from the dimerization step is then contacted with an olefin reaction catalyst under conditions suitable to produce a product of the olefin reaction.

The olefin reaction is defined as a process for the catalytic conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction includes but is not limited to the following reactions:

(1) the disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene; or (2) the conversion of an acyclic mono- or polyene having three of more carbon atoms and a different acyclic mono- or polyene having three or more carbon atoms to produce different acyclic olefins; for example, the conversion of propylene and isobutylene yields ethylene and isopentene.

The catalysts which are useful for the present invention are those which have activity for the disproportionation of propylene into ethylene and butenes. Some examples of such catalysts are (1) silica or thoria promoted by an oxide or compound convertible to an oxide by calcination or sulfide of tungsten or molybdenum or by an oxide or compound convertible to an oxide by calcination of rhenium, or tellurium;

(2) alumina promoted with an oxide or compound convertible to an oxide by calcination of molybdenum, tungsten, or rhenium; a sulfide of tungsten or molybdenum; or an alkali metal salt, ammonium salt, alkaline earth metal salt, or bismuth salt of phosphomolybdic acid;

(3) one or more of the group aluminum phosphate, zirconium phosphate, calcium phosphate, magnesium phosphate, or titanium phosphate promoted by one or more of a sulfide of molybdenum or tungsten, or an oxide of molybdenum, tungsten or rhenium or magnesium tungstate or beryllium phosphotungstate; and (4) silica, alumina, aluminum phosphate, zirconium phosphate, calcium phosphate, magnesium phosphate, or titanium phosphate promoted by a hexacarbonyl of molybdenum or tungsten.

The catalysts of (1) can be prepared and activated by conventional techniques such as by combining a catalyst grade silica with suitable tungsten, molybdenum, rhenium or tellurium compounds by a conventional method such as, for example, impregnation, dry mixing, or coprecipitation. Suitable tungsten and molybdenum compounds include tungsten oxide and molybdenum oxide and compounds convertible to these oxides. The supported oxides are activated by calcining in air and the supported sulfides are activated by heating in an inert atmosphere.

The catalysts of (2) can be prepared and activated by conventional techniques such as by combining catalyst grade alumina with an oxide or a compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate followed by calcination in air to produce an activated catalyst. Alternatively, the support material can be impregnated with a compound of the promoter convertible to the oxide, such as ammonium tungstate, followed by calcination in air. In the preparation of a sulfide-containing catalyst, a sulfide of the promoter can be ball-milled with a support, such as zirconium phosphate, followed by heating in an inert atmosphere such as nitrogen. Magnesium tungstate and beryllium phosphotungstate can be dry mixed with titanium phosphate, for example, and activated by calcination in the air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50 to 700° F.

The catalytic agent is considered to be the reaction product resulting from the admixture of the support material and the promoter material which is subjected to activation treatment.

The operating temperature for the process of this invention when using catalysts of (1) is in the range of about 400 to 1100° F. The process of this invention when using the catalysts of (2) will be operated at a temperature in the range of about 150 to 500° F. The process using the catalysts of (3) will be carried out at a temperature of about 600 to 1200° F. The process using the catalysts of (4) will be carried out at a temperature of about 0 to 600° F. In the process of the invention, pressures are not important but will be in the range of about 0 to 2,000 p.s.i.g.

Other catalysts include those disclosed in Ser. No. 412,343, filed Nov. 19, 1964, now U.S. Pat. No. 3,395,196; Ser. No. 517,918, filed Jan. 3, 1966, now U.S. Pat. No. 3,442,969; Ser. No. 517,905, filed Jan. 3, 1966, now U.S. Pat. No. 3,444,262; Ser. No. 421,692, filed Dec. 28, 1964, now U.S. Pat. No. 3,418,390; Ser. No. 529,230, filed Feb. 23, 1966, now abandoned; Ser. No. 516,673, filed Dec. 27, 1965; and U.S. Pat. No. 3,261,879, issued July 19, 1966.

After the hydrocarbon stream leaves the reaction zone of the second catalytic stage, any suitable method is used to separate the hydrocarbon phase from the catalyst phase and to recover the products. Techniques such as fractonation, solvent extraction, adsorption, and the like, may be employed for the separation of products. Unconverted feed materials, diluents, or products not in the desired molecular weight range can be recycled. When the feed is propylene in addition to methylbutenes, the process produces some ethylene, butenes, and other heavier olefins.

In the drawing, there is illustrated schematically apparatus suitable for practicing the invention. Dimerization reactor 11, olefin reaction reactor 12 and separation means 13 are provided as shown. A pipe 14 is provided for feed to reactor 11, a pipe 16 for conducting effluent from reactor 11 to reactor 12 and a pipe 17 for conducting effluent from reactor 12 to separation means 13. Pipes 18, 19, 21 and 22 are provided for removing separate streams from separation means 13 and pipes 23 and 24 for recycling to pipe 14 and pipe 16, respectively.

In the operation of the invention, for the conversion of propylene to methylbutene, propylene is fed through pipe 14 and the entire effluent from reactor 11, including propylene and 4-methylpentene-2 is fed to olefin reaction reactor 12. The effluent from reactor 12 including methylbutene is fed to separation means 13. Any unreacted propylene is recycled through pipe 23 to pipe 14 and any unreacted propylene dimer is recycled through pipe 24 to pipe 16. Materials lighter than propylene are removed through pipe 18, materials boiling between propylene and hexene are removed through pipe 22 and materials heavier than hexene are removed through pipe 19. Product methylbutenes are removed through pipe 21.

The illustration is, of course, schematic, to simplify the description. Many elements required in commercial operation have been eliminated, including valves, controls, etc. Separation means 13, although shown as a single box in the diagram, is intended to represent necessary pieces of separation equipment to make the desired separation, including fractional distillation columns, extraction units, etc.

The invention can be further illustrated by the following example.

EXAMPLE

Propylene was converted in a two-step process to methylbutenes and other olefins in a system which utilized two fixed catalytic beds. A feed stream containing 59.3 weight percent propylene and 30.7 weight percent propane was passed through a stainless steel fixed bed reactor containing of a nickel oxide-silica-alumina catalyst at 160–260° F., 450 p.s.i.g., and at a gaseous hourly space velocity of 2400 v./v./hr. The effluent from this catalytic zone was conducted through a back-pressure value, through a preheater to elevate the temperature to about 1000–1070° F. and then through a second catalytic bed containing 10 ml. (4.04 g.) of a tungsten oxide-silica olefin disproportionation catalyst at 20 p.s.i.g., and at a gaseous hourly space velocity of 4800 v./v./hr.

The nickel oxide dimerization catalyst was prepared by impregnating a conventional catalytic grade silica-alumina gel (containing about 88 weight percent silica) with an aqueous solution containing $NiNO_3 \cdot 6H_2O$. This solid was dried and heat treated for 2 hours at 1000° F. in a flowing stream of dry air yielding a catalyst containing about 4 weight percent nickel oxide. The olefin reaction catalyst was similarly prepared by impregnating 109 parts by weight of a conventional silica gel with 11.16 parts by weight ammonium metatungstate. The catalyst, containing about 8 weight percent tungsten oxide, was dried and heat treated in a stream of flowing dry air for 2 hours at 1100° F.

In the course of the reaction, the process stream was sampled at a point just after the propylene dimerization stage and also at a point just after the olefin reaction stage. The samples were analyzed and the products obtained at those two stages are shown in the following table.

TABLE

| | Products | |
| --- | --- | --- |
| | Dimerization reaction | Dimerization-disproportionation reaction |
| Ethylene, ethane | | 2.9 |
| Isobutane | 0.6 | 0.6 |
| n-Butane | | 0.4 |
| Isobutylene, 1-butene | 0.2 | 15.3 |
| trans-2-butene | 0.1 | 8.5 |
| cis-2-butene | 0.1 | 6.1 |
| 1-pentene | t | 2.2 |
| trans-2-pentene | t | 4.8 |
| cis-2-pentene | t | 2.8 |
| 3-methylbutene-1 | t | 1.4 |
| 2-methylbutene-1 | t | 3.0 |
| 2-methylbutene-2 | 1.7 | 6.4 |
| $C_6$ | 97.5 | 45.7 |

The data obtained from the above test indicated that about 56 percent of the propylene was converted in the first reactor. Of the feed going to the second reactor, 27 percent of the dimerization reaction products and 55 percent of the propylene were converted to other olefins having 2, 4 and 5 carbon atoms per molecule. About 11 percent of the propylene was converted to methylbutenes.

Reasonable variation and modification are possible within the scope of the invention which sets forth a method for converting hydrocarbons and in one aspect a method for preparing methylbutene from propylene.

I claim:
1. A process for converting propylene to produce methylbutene, comprising the steps of:
    feeding propylene into a dimerization zone and producing therein a branched acyclic dimer of propylene including 4-methylpentene-2;
    feeding propylene and 4-methylpentene-2 from said dimerization zone into an olefin reaction zone and converting said propylene and 4-methylpenten-2 in said olefin reaction zone to produce methylbutene by the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond;
    separating the effluent from said olefin reaction zone to produce a first stream comprising propylene, a second stream comprising propylene dimer, and a third stream comprising methylbutene;
    recycling said first stream to said dimerization zone; and
    recycling said second stream to said olefin reaction zone.
2. The method of claim 1 wherein substantially the entire effluent from the dimerization zone is fed to the olefin reaction zone.

References Cited

UNITED STATES PATENTS

| | | | |
|---|---|---|---|
| 2,500,307 | 3/1950 | Brooke et al. | 260—683.15 |
| 2,614,137 | 10/1952 | Chenicek | 260—683.15 |
| 2,622,113 | 12/1952 | Hervert | 260—683.15 |
| 3,046,316 | 7/1962 | Gudelis | 260—683.15 |
| 3,261,879 | 7/1966 | Banks | 260—683.15 X |
| 3,330,882 | 7/1967 | Albright | 260—683.15 |

PAUL M. COUGHLAN, JR., Primary Examiner

U.S. Cl. X.R.

260—683.15